United States Patent [19]

Buding

[11] Patent Number: 5,542,974
[45] Date of Patent: Aug. 6, 1996

[54] SHAPED MASTICATING AGENTS CONTAINING PARAFFIN

[75] Inventor: Hartmuth Buding, Titz, Germany

[73] Assignee: Bayer AG, Leverkusen, Germany

[21] Appl. No.: 509,492

[22] Filed: Jul. 31, 1995

[30] Foreign Application Priority Data

Aug. 11, 1994 [DE] Germany ............ 44 28 457.8

[51] Int. Cl.$^6$ ............... C08C 4/00; C08J 3/18; C08K 9/08; C08K 5/36
[52] U.S. Cl. ............ 106/270; 106/502; 106/316; 524/225
[58] Field of Search ............ 106/270, 316, 106/502; 524/225

[56] References Cited

FOREIGN PATENT DOCUMENTS 2440092  3/1975  Germany ............ C08L 9/00

OTHER PUBLICATIONS

Orbit Abstract of DE 24 40 092 (Mar. 20 1975).
CA 95:116808 "Peptization of natural rubber in an internal mixer", Crowther.
Der Geschäftsbereich Kautschuk, Leistung und Fortschritt, *Synthesekautschuke und Kautschuk–Chemikalien*, p. 46, (Dec. 1994).
SGF Rubber Handbook, 8th Edition, The Swedish Institute of Rubber Technology, p.186, (1990) no month available.

*Primary Examiner*—David Brunsman
*Attorney, Agent, or Firm*—Connolly & Hutz

[57] ABSTRACT

This invention relates to shaped, non-dusting, non-sticking, free-flowing masticating agents based on 2,2'-dibenzoamidodiphenyl disulphide and paraffins having a solidification point in the range from 50° to 85° C., a needle penetration of 8 to 25 in $\frac{1}{10}$ mm, a viscosity of 2 to 10 mm$^2$/s. The masticating agents according to the invention are used to reduce the viscosity of rubbers containing double bonds and are customarily used in quantities of 0.01 to 3 parts by weight.

2 Claims, No Drawings

SHAPED MASTICATING AGENTS CONTAINING PARAFFIN

This invention relates to shaped, non-dusting, non-caking, flee-flowing masticating agents based on 2,2'-dibenzoamido-diphenyl disulphide (DBD).

Masticating agents are chemical agents which may be used to reduce the viscosity of natural rubber (NR) in a time- and cost-saving manner in comparison with purely mechanical mastication. Mastication improves the processability of low plasticity NR, i.e. the incorporation of fillers and chemicals is facilitated and behaviour during calendering, extrusion and injection moulding is positively influenced. Masticating agents also reduce the viscosity of synthetic rubbers, providing that these have double bonds in the main chain, such as for example polyisoprene rubber, polybutadiene rubber or styrene/butadiene rubber. Mastication may be performed on a roll mill or in a kneader (W. Hofmann, Kautschuk-Technologie, page 419 and page 429, Genter Verlag, Stuttgart, 1980).

Many compounds having a masticating action have been discovered. However, only those masticating agents based on pentachlorothiophenol (PCTP) or DBD have been established industrially.

It is known to use PCTP in the form of its zinc salt as a masticating agent. It is moreover known to use PCTP as a formulation with activators (organometallic complexes) and inactive fillers (distribution agents), such as for example kaolin, as a masticating agent in the form of powder, oil coated powder or wax granules (M. Abele and Th. Kempermann, Kautschuk+Gummi Kunststoffe 42(1989)209).

French patent specification FR 1,580,550 describes mastication operations with mixtures of fatty acid zinc salts and aromatic masticating agents containing sulphur (for example DBD or PCTP zinc salt). Similar masticating agents additionally containing iron phthalocyanine, are known from German patent specification DE 2 820 978.

DBD is also known as a masticating agent in powder form (c.f. Pepton 22, a masticating agent from Anchor Chemical Ltd., Manchester (UK)).

Masticating agents prepared from DBD, iron phthalocyanine and a diluent, such as for example various clays, diatomaceous earth, calcium carbonate, silica or waxes are described (DE-OS 2 440 092). A preferred diluent is hydrated aluminium silicate. Mixtures of the inert, solid diluents may, however, also be used (c.f. page 6, lines 10 to 16). The masticating agent formulations containing diluents are free-flowing powders.

The term "wax" is no further defined in DE-OS 2 440 092. It may, however, be assumed that products available industrially in large quantities and at low cost are intended, such as for example petroleum paraffins.

Common features of all masticating agents or masticating agent formulations in powder form are that, on the one hand, they are to a greater or lesser extent flowable or free-flowing and, on the other hand, produce large amounts of dust during handling, such as for example weighing, dosing and processing. This is a major disadvantage from the point of view of occupational hygiene. While oil coated powders do indeed exhibit a reduced tendency to dust, they are, however, in fact not completely dust-free if they are still intended to remain free-flowing.

Pepton 66, a commercial masticating agent in form of granules from Anchor Chemical Ltd., Manchester (UK) based on DBD, tends to cake when stored under pressure and at elevated temperature, so causing difficulties with modern automatic weighing and dosing of the masticating agent. According to our IR spectroscopic investigations, the binder in Pepton 66 consists of paraffin and has a melting point of 48° C. (DSC method, heating rate 10° C./min).

There is increasing demand from the rubber processing industry for shaped, nondusting, non-caking, free-flowing masticating agents based on DBD for reasons of occupational hygiene and labour rationalisation with regard to automatic weighing and dosing of the masticating agent.

Shaped masticating agents which do not stick together under load and produced from DBD, alumina, process oil, non-ionic emulsifier and water are known from JP 59-193 939. A disadvantage of these products is their production process. Thus, after granulation of the mixture moistened with water, the water used, according to the example 20 parts of water relative to 100 parts of DBD, must be evaporised. This is a time-consuming and costly processing stage.

A shaped masticating agent which may be produced simply and does not cake under pressure and elevated temperature based on PCTP with paraffin as binder has been offered for sale by Bayer AG as Renacit 7/WG. According to Handbuch für die Gummiindustrie (pages 462–463, 2nd completely revised edition, publisher: Bayer AG/Leverkusen, Rubber Business Group, Applications Development Section, copy deadline 1.6.91), the paraffin used as binder in Renacit 7/WG is a mixture of oil and wax, i.e. a mixture of liquid and solid paraffin. This binder exhibited a melting point of 59° C. (DSC method, heating rate 10° C./min).

Attempts to produce shaped, free-flowing masticating agents based on DBD according to the prior art, corresponding to Renacit 7/WG, using a mixture of liquid and solid paraffin as binder, resulted in products which unexpectedly tended to stick together in the caking test under pressure and elevated temperature (see example 1 of this application), so excluding automatic weighing and dosing of such products for the mastication process. The melting point of the binder used was 60° C. (DSC method, heating rate 10° C./min).

The object of the present invention was thus to provide, shaped, non-dusting masticating agents containing DBD which are easily produced and which on storage under pressure and elevated pressure do not cake and are thus always perfectly free-flowing and which may rapidly and perfectly be incorporated and distributed in the rubber to be masticated using mixing units customary in the rubber processing industry (for example roll mills, kneaders).

This object was surprisingly achieved by using certain solid paraffins as the binder.

The present invention thus provides shaped, non-dusting, non-sticking, free-flowing masticating agents characterised by a content of 10 to 70 parts by weight, preferably of 20 to 60 parts by weight, in particular of 30 to 50 parts by weight of 2,2'-dibenzoamidodiphenyl disulphide (DBD), a content of 50 to 15 parts by weight, preferably of 48 to 17 parts by weight, in particular of 45 to 20 parts by weight of inactive fillers, optionally a content of 0.01 to 5 parts by weight, preferably of 0.05 to 2 parts by weight, in particular of 0.1 to 1 part by weight of activators and a content of 40 to 15 parts by weight, preferably 40 to 17 parts by weight, in particular 40 to 20 parts by weight of paraffins having a solidification point in the range from 50° to 85° C., preferably in the range from 50° to 75° C., in particular from 50° to 70° C. (DIN ISO 2207), a needle penetration of 8 to 25 in ¹⁄₁₀ mm, preferably of 8 to 22 in ¹⁄₁₀ mm, in particular of 8 to 18 in ¹⁄₁₀ mm (DIN 51 578, 25° C.), a viscosity of 2 to 10 mm$_2$/s, preferably of 3 to 8 mm$^2$/s, in particular of 2 to 5.5 mm$^2$/s (DIN 51 562, 100° C.) and a residual oil content originating from the petrochemical petroleum refining process of less than 3 parts by weight, preferably of less than 2 parts by weight (DIN ISO 2908), relative to the native paraffin used, wherein the sum of the parts by weight used in relation to DBD, inactive filler, activators and paraffins should always be 100 parts by weight.

Preferred paraffins for the purposes of the invention are obtained from petroleum and constitute a mixture of n-paraffins and i-paraffins, wherein the n-paraffin fraction in this mixture is approximately 51 to 99 parts by weight relative to the total paraffin mixture. This mixture of n-paraffins and i-paraffins may optionally contain further n-paraffins produced from carbon monoxide and hydrogen using the Fischer-Tropsch process, wherein the proportion of synthetic n-paraffins is at most 15 parts by weight, preferably at most 9 parts by weight, in particular at most 7 parts by weight relative to the total quantity of native and synthetic paraffin.

Activators for the purposes of the invention are the known compounds iron phthalocyanine and iron hemiporphyrazine (DE-OS 2 440 092; Ullmann's Encyclopedia of Industrial Chemistry, 5th edition, page 405, VCH Verlagsgesellschaft, Weinheim, 1993) or mixtures thereof.

Inactive fillers (diluents) for the purposes of the invention are, for example, not only kaolin, calcium carbonate, diatomaceous earth, kieselguhr and barium sulphate, but also mixtures thereof. Particularly preferred inactive fillers are kaolin and calcium carbonate.

In order to shape the masticating agent, the DBD, inactive fillers and optionally activators are each used as a fine powder. The average particle diameter of these substances is <200 µm, preferably 0.01 to 100 µm, in particular 0.1 to 80 µm.

A preferred process for the production of the shaped masticating agents is discontinuous mixing of the pulverulent constituents in rotating mixing vessels, such as for example drum mixers, optionally also having fitted mixing tools, such as for example plough-type blade mixers, guided-blade mixers or paddle mixers, as well as mixers with rapidly rotating mixing tools, and spraying of the homogeneously mixed, pulverulent constituents with finely divided molten paraffins with continued mixing. Continuously operated mixers may, however, also be considered.

The powder mixture sprayed with finely divided paraffins is then introduced into a continuous single screw mixer (extruder), preferably a continuous twin screw mixer (twin screw extruder) preferably with co-rotating screws. By means of appropriate temperature control in the extruder, the solid paraffins pursuant to the invention are remelted and the resultant paste is pressed through a suitable perforated plate in order to form granules. Extruders having a mixing zone for further homogenisation of the product to be extruded are advantageously used.

In another embodiment for the production of shaped masticating agents, the paraffins pursuant to the invention in the form of finely divided sprayed pellets of an average particle diameter of <1000 µm, preferably of 10 to 800 µm, in particular of 10 to 600 µm, are mixed with the other pulverulent constituents in a mixer and the homogeneous mixture is then shaped into granules using an extruder.

The paraffins pursuant to the invention may, however, also be pumped in molten form at an appropriate point in the extruder into the pulverulent, homogeneously mixed substances which are to be bound.

A paste consisting of pulverulent DBD, pulverulent fillers and optionally pulverulent activators together with molten paraffins may also be processed into flakes by brushing or casting onto a chill roll, or into pellets using a pelletising belt.

The shaped masticating agents may be incorporated and distributed outstandingly well in the rubber to be masticated.

Depending upon the desired reduction in viscosity, the shaped masticating agents are used in quantities of 0.01 to 3 parts by weight, preferably of 0.05 to 1 part by weight, relative to 100 parts by weight of rubber.

EXAMPLES

Example 1 (comparative example)

A mixture of 40.8 parts by weight of DBD powder, 0.5 parts by weight of iron phthalocyanine powder and 33.2 parts by weight of kaolin powder was mixed in the laboratory in a 20 l drum mixer with plough-type blade inserts from the company Lödige for 10 minutes at 150 rpm. The powder mixture was then introduced into a high-speed laboratory mixer fitted with blade-shaped inserts, sprayed with 25.5 parts by weight of molten paraffin consisting of (a) 14.2 parts by weight of a solid paraffin obtained from petroleum and containing no added synthetic n-paraffins, having a density of 0.825 g/ml at 15° C. to DIN 51 757, a solidification point of 62.5° C. to DIN ISO 2207, a viscosity of 5 mm$^2$/s at 100° C. to DIN 51 562, a needle penetration of 14 in 0.1 mm at 25° C. to DIN 51 579 and a residual oil content of 0.75 parts by weight (relative to 100 parts by weight of solid paraffin) to DIN ISO 2908 and (b) 11.3 parts by weight of a liquid paraffin obtained from petroleum and containing no added synthetic n-paraffins, having a density of 0.860 g/ml at 15° C. to DIN 51 757, a kinematic viscosity of 19.9 mm$^2$/s at 40° C. to DIN 51 562, a pour point of at most −12° C. to DIN ISO 3016, a refractive index $n_D^{20}$ of 1.473 to DIN 51 423, a refraction intercept of 1.045 to DIN 51 368 and a VDK value of 0.815 to DIN 51 378 and mixed in such a manner that the DBD, kaolin and the activator are homogeneously distributed in the paraffin mixture. Granules were then produced using a co-rotating twin screw extruder with a mixing zone and perforated plate. Granule diameter was 3.5 mm, granule length between approximately 5 and 8 mm.

Example 2

The same procedure was used as in example 1, wherein the 25.5 parts by weight of molten paraffin consisted solely of the solid paraffin described under (a). The proportion of liquid paraffin, described under (b), was zero.

Example 3 (comparative example)

The same procedure was used as in example 2, but the solid paraffin (a) used was a paraffin obtained from petroleum and containing no added synthetic n-paraffins, having a density of 0.848 g/ml at 15° C. to DIN 51 757, a solidification point of 71° C. to DIN ISO 2207, a viscosity of 13.5 mm$^2$/s at 100° C. to DIN 51 562, a needle penetration of 26 in 1/10 mm at 25° C. to DIN 51 579 and a residual oil content of 3.0 parts by weight (relative to 100 parts by weight of solid paraffin) to DIN ISO 2908.

Example 4

The caking behaviour under pressure and elevated temperature of the granules obtained according to examples 1 to 3 was tested as follows:

50 g of granules were carefully placed in a glass tube (internal diameter 50.3 mm) standing vertically in a Petri dish and exposed to a load of 0.1729 kg/cm$^2$ with a ram (external diameter 47.0 mm) for 2.5 days at an ambient temperature of 40° C. The test apparatus was then cooled to 23° C. and the Petri dish removed and the granules optionally pushed out of the tube. When pressing out the sample, care must be taken to ensure that caked granules fall onto the test surface from the lowest height possible, as the test findings are otherwise falsified. The degree of caking was marked as follows:

Mark 0: Sample flows out of the glass tube by itself; no adhesion to glass; no caking of individual granules.

Mark 1: Sample sticks to glass and has to be pressed out with the ram; slight caking of granules which may easily be broken up by hand.

Mark 2: Sample sticks to glass and has to be pressed out with the ram; moderate caking of granules.

Mark 3: Sample sticks to glass and has to be pressed out with the ram; severe caking of granules; granules may be separated from each other only with partial destruction.

The test results are shown in table 1. It may clearly be seen that the product of the invention according to example 2 does not cake and is thus clearly superior to the prior art product according to example 1.

TABLE 1

|  | Comparative Example | | Example 2 according to the invention |
| --- | --- | --- | --- |
|  | No. 1 | No. 2 |  |
| Caking tendency mark | 1 | 2 | 0 |

I claim:
1. Shaped, non-dusting, non-sticking, free-flowing masticating agents characterised by a content of 10 to 70 parts by weight of 2,2'-dibenzoamidodiphenyl disulphide (DBD), a content of 50 to 15 parts by weight of inactive fillers, optionally a content of 0.01 to 5 parts by weight of activators and a content of 40 to 15 parts by weight of paraffins having a solidification point in the range from 50° to 85° C., a needle penetration of 8 to 25 in $\frac{1}{10}$ mm, a viscosity of 2 to 10 mm$^2$/s and a residual oil content originating from the petrochemical petroleum refining process of less than 3 parts by weight, relative to the native paraffin used, wherein the sum of the parts by weight used in relation to DBD, inactive filler, activators and paraffins should always be 100 parts by weight.

2. A method of masticating rubbers containing double bonds comprising adding 0.01 to 3 parts by weight, relative to 100 parts by weight of rubber, of the masticating agent of claim 1 to said rubber and masticating the mixture.

* * * * *